United States Patent
Han

(10) Patent No.: US 8,144,347 B2
(45) Date of Patent: Mar. 27, 2012

(54) METHOD OF CONTROLLING PRINT JOB SCHEDULE AND PRINTING SYSTEM USING THE METHOD

(75) Inventor: Ho-sung Han, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 369 days.

(21) Appl. No.: 12/216,246

(22) Filed: Jul. 1, 2008

(65) Prior Publication Data

US 2008/0266603 A1 Oct. 30, 2008

Related U.S. Application Data

(62) Division of application No. 10/681,741, filed on Oct. 9, 2003, now Pat. No. 7,505,166.

(30) Foreign Application Priority Data

Oct. 11, 2002 (KR) ................................ 2002-62114

(51) Int. Cl.
*G06F 15/00* (2006.01)
*G06F 15/173* (2006.01)

(52) U.S. Cl. ...................................... 358/1.14; 709/223

(58) Field of Classification Search ................. 358/1.15, 358/1.13, 1.14, 1.16, 402, 450, 451, 1.2, 358/440; 709/223, 224, 229, 217, 202, 225, 709/206; 235/487, 382; 713/193, 179
See application file for complete search history.

(56) References Cited

U.S. PATENT DOCUMENTS

| | | | |
|---|---|---|---|
| 5,206,735 A | | 4/1993 | Gauronski et al. |
| 5,293,466 A | * | 3/1994 | Bringmann ................... 358/1.15 |
| 5,402,527 A | * | 3/1995 | Bigby et al. ................... 358/1.1 |
| 5,475,801 A | * | 12/1995 | Brindle et al. ................ 358/1.15 |
| 5,511,149 A | * | 4/1996 | Hayano ......................... 358/1.13 |
| 5,715,379 A | | 2/1998 | Pavlovic et al. |
| 5,774,356 A | | 6/1998 | Hisatake et al. |

(Continued)

FOREIGN PATENT DOCUMENTS

JP 04-043426 2/1992

(Continued)

OTHER PUBLICATIONS

Chinese Office Action issued in Chinese Patent Application No. 2003101147467; mailed Mar. 10, 2006.

(Continued)

*Primary Examiner* — Saeid Ebrahimi Dehkordy
(74) *Attorney, Agent, or Firm* — Staas & Halsey LLP

(57) ABSTRACT

A printing system including a first memory unit storing a printer operating system and at least two interpreters; a second memory unit having an operating area for the printer operating system, an operating area and a heap area for each interpreter of the first memory unit, and at least two reception buffers temporarily storing incoming print job data; a printing control unit controlling operation of the printing system based on the printer operating system, controlling the interpreters of the first memory unit to interpret the print job data, and transmitting the interpreted print job data to a printer engine; and a print job scheduling unit providing a first scheduling procedure regarding initiation of the interpreters for multiple print jobs and a second scheduling procedure regarding interpretation of the multiple print jobs that have been initiated, the printer control unit using the first scheduling procedure and the second scheduling procedure to control the operation of the interpreters.

9 Claims, 6 Drawing Sheets

U.S. PATENT DOCUMENTS

| | | | |
|---|---|---|---|
| 5,970,224 | A | 10/1999 | Salgado et al. |
| 6,332,170 | B1 | 12/2001 | Ban |
| 2002/0101603 | A1 | 8/2002 | Christodoulou et al. |
| 2002/0118387 | A1 | 8/2002 | Patton |
| 2002/0171856 | A1 | 11/2002 | Ackerman et al. |

FOREIGN PATENT DOCUMENTS

| | | |
|---|---|---|
| JP | 06-064251 | 3/1994 |
| JP | 07-137359 | 5/1995 |
| JP | 09-190317 | 7/1997 |
| JP | 10-283134 | 10/1998 |
| JP | 11-338652 | 12/1999 |
| JP | 2001-222396 | 8/2001 |

OTHER PUBLICATIONS

European Search Report issued May 8, 2008 in corresponding European Patent Application No. 03256403.1-1245.

* cited by examiner

METHOD OF CONTROLLING PRINT JOB SCHEDULE AND PRINTING SYSTEM USING THE METHOD

CROSS-REFERENCE TO RELATED APPLICATIONS

This application is a divisional application of U.S. application Ser. No. 10/681,741 filed Oct. 9, 2003, now U.S. Pat. No. 7,505,166 and claims the benefit of Korean Patent Application No. 10-2002-0062114, filed on Oct. 11, 2002, in the Korean Intellectual Property Office, the disclosure of which is incorporated herein by reference.

BACKGROUND OF THE INVENTION

1. Field of the Invention

The present invention relates to a printing system, and, more particularly, to a method of controlling a print job schedule that ensures efficient printing processes in a network printing system shared by multiple users or in a high-speed printing system, and a printing system using the method.

2. Description of the Related Art

In a general network printing system where one network printer is shared by multiple users, in response to a print command from a client computer, an internal printer driver is accessed to convert data format from graphic data of an application program, which is used to command printing, to data in page description language (PDL), which is interpretable by a target network printer. For example, a postscript (PS) printer driver transmits graphics, images, and text in various formats of different application programs through format conversion into PS language, and a printer command language (PCL) printer driver transmits graphics, images, and text in various formats of different application programs through format conversion into PCL language.

The network printer temporarily stores print job data, transmitted through a network from a user, in a reception buffer of a random access memory (RAM). A printing controller accesses a predetermined interpreter, for example, a PCL or PS interpreter, stored in a read-only memory (ROM) to convert the print job data to a printable data format and transmits the converted print job data to a printer engine.

In a conventional network printing system, only one interpreter operating area is reserved in RAM for each interpreter stored in ROM, regardless of the type of interpreter. However, such a printing environment causes the following problems. For example, assuming that user A gave a command to print a 100-page document a little earlier than user B who has a 1-page document to print, user B must wait until the 100-page document of user A is completely printed. Even if a document which user A needs to print includes only a few pages, if the document includes graphics or text of various fonts that burden an interpreter with complicated, repetitive operations, user B must wait a considerably long time until the print job for user A is terminated.

In a conventional printing system that is not shared by multiple users, assuming that a user has print job A, and print job B, if print job A which will take a long time to print is sent to the printing system before print job B, which is only one-page long, the user must wait until print job A is terminated or must abort printing print job A to obtain a printout for print job B in a short amount of time. Therefore, efficient, high-speed printing is virtually impossible.

SUMMARY OF THE INVENTION

It is an aspect of the present invention to provide a method of controlling a print job schedule by applying a first scheduling procedure for controlling the initiation of interpreters for multiple print jobs, and a second scheduling procedure for controlling a process of interpreting the multiple print job data that have been initiated, the method ensuring efficient printing in a network printing system shared by multiple users or in a high-speed printing system.

It is another aspect of the present invention to provide a printing system suitable for the above print job schedule control method.

Additional aspects and/or advantages of the invention will be set forth in part in the description which follows and, in part, will be obvious from the description, or may be learned by practice of the invention.

To achieve the above and/or other aspects of the present invention, there is provided a printing system including a first memory unit storing a printer operating system and at least two interpreters; a second memory unit having an operating area for the printer operating system, an operating area and a heap area for each interpreter of the first memory unit, and at least two reception buffers temporarily storing incoming print job data; a printing control unit controlling operation of the printing system based on the printer operating system, controlling the interpreters of the first memory unit to interpret the print job data, and transmitting the interpreted print job data to a printer engine; and a print job scheduling unit providing a first scheduling procedure regarding initiation of the interpreters for multiple print jobs and a second scheduling procedure regarding interpretation of the multiple print jobs that have been initiated, the printer control unit using the first scheduling procedure and the second scheduling procedure to control the operation of the interpreters.

To achieve the above and/or other aspects of the present invention, there is provided a method of controlling a print job schedule, the method including scheduling initiation of interpreters to initiate interpretation of succeeding print job data earlier, even when preceding print job data are being interpreted, when an interpreter run time for the preceding print job data exceeds a predetermined amount of time; and scheduling interpretation of multiple print job data by time-sharing to alternate between the multiple print job data when the multiple print job data have equal occupation ratios without priorities, or scheduling interpretation of multiple print job data by time-sharing according to occupation ratios when the multiple print job data have different occupation ratios without priorities.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENT

Figure 1:
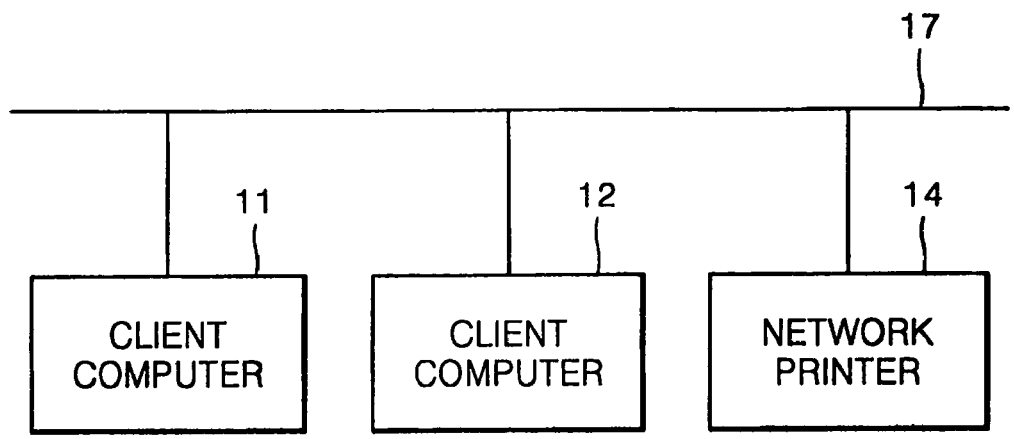
FIG. 1 illustrates the configuration of a network printing system using a print job schedule control method according to an embodiment of the present invention.

Reference will now be made in detail to the embodiment of the present invention, an example of which is illustrated in the accompanying drawings, wherein like reference numerals refer to the like elements throughout. The embodiment is described below to explain the present invention by referring to the figures.

FIG. 1 illustrates the configuration of a network printing system using a print job schedule control method according to an embodiment of the present invention. In FIG. 1, n client computers 11 and 12, where n is an integer greater than or equal to 2, are information processors linked to a network 17 by network cables. A printer driver, which converts print job data into a printer description language, such as printer command language (PCL) or postscript (PS), is stored in each client computer 11, 12. The printer driver is able to support various printer description languages in this embodiment of the present invention.

A network printer 14 is linked to the network 17 via a communications interface unit (not shown), converts print job data from a single command transmitted from the client computer 11 or 12 into dot images page by page, and prints the images page by page.

Figure 2:
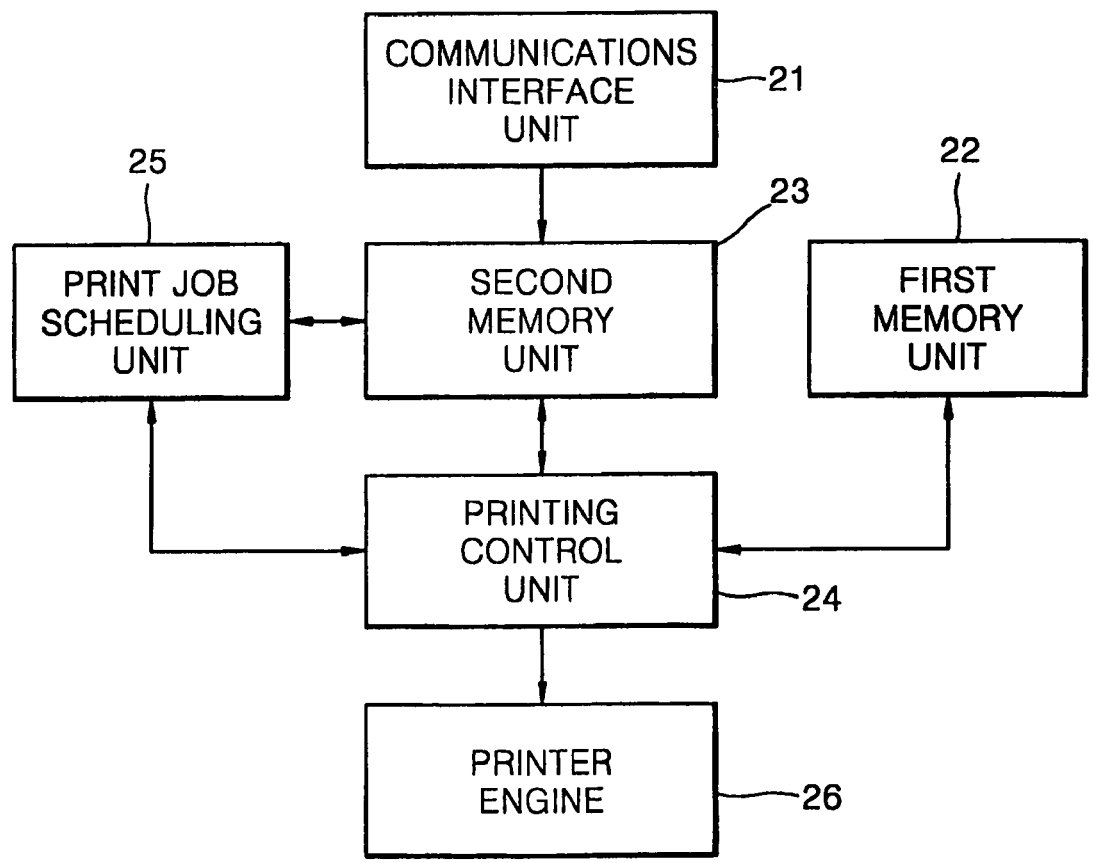
FIG. 2 is a block diagram illustrating the configuration of a network printer shown in FIG. 1.

FIG. 2 is a block diagram illustrating the configuration of the network printer 14 according to the present invention. Although in this embodiment the network printer is implemented as a laser beam printer (LBP), other types of printers may be used for the network printer 14.

In FIG. 2, a communications interface unit 21 includes a network card having original media access control (MAC) addresses assigned thereto, and is responsible for data transmission and reception between the client computer 11 or 12 and the network printer 14 via the network 17, which may be, for example, the Internet or a local area network (LAN).

A first memory unit 22 is implemented as a common ROM and includes a printer operating system (OS) and at least two interpreters, which may be the same or different types of interpreters.

A second memory unit 23 is implemented as a common RAM and includes an operating area for a printing control program (i.e., the printer operating system (OS)), operating areas for at least two interpreters, which may be the same or different types of interpreters, and heap areas for the respective interpreters. Areas for a first reception buffer 32 and a second reception buffer 33 (FIG. 3) exist in the OS operating area or in the interpreter heap areas.

A printing control unit 24 accesses the printer OS stored in the first memory unit 22 to control the overall operation of the printer; interprets print job data transmitted from the client computer 11, 12 using corresponding interpreters to generate bit map data, and transmits the bit map data to a printer engine 26.

A print job scheduling unit 25 controls the operation of the second memory unit 23 and the printing control unit 24 when there are multiple print job requests, according to a first scheduling procedure for controlling the initiation of interpreters for the multiple print jobs and a second scheduling procedure for controlling the process status of the multiple print jobs that have been initiated.

The printer engine 26 prints the bit map data generated by the printing control unit 24 onto printing paper.

Figure 3:
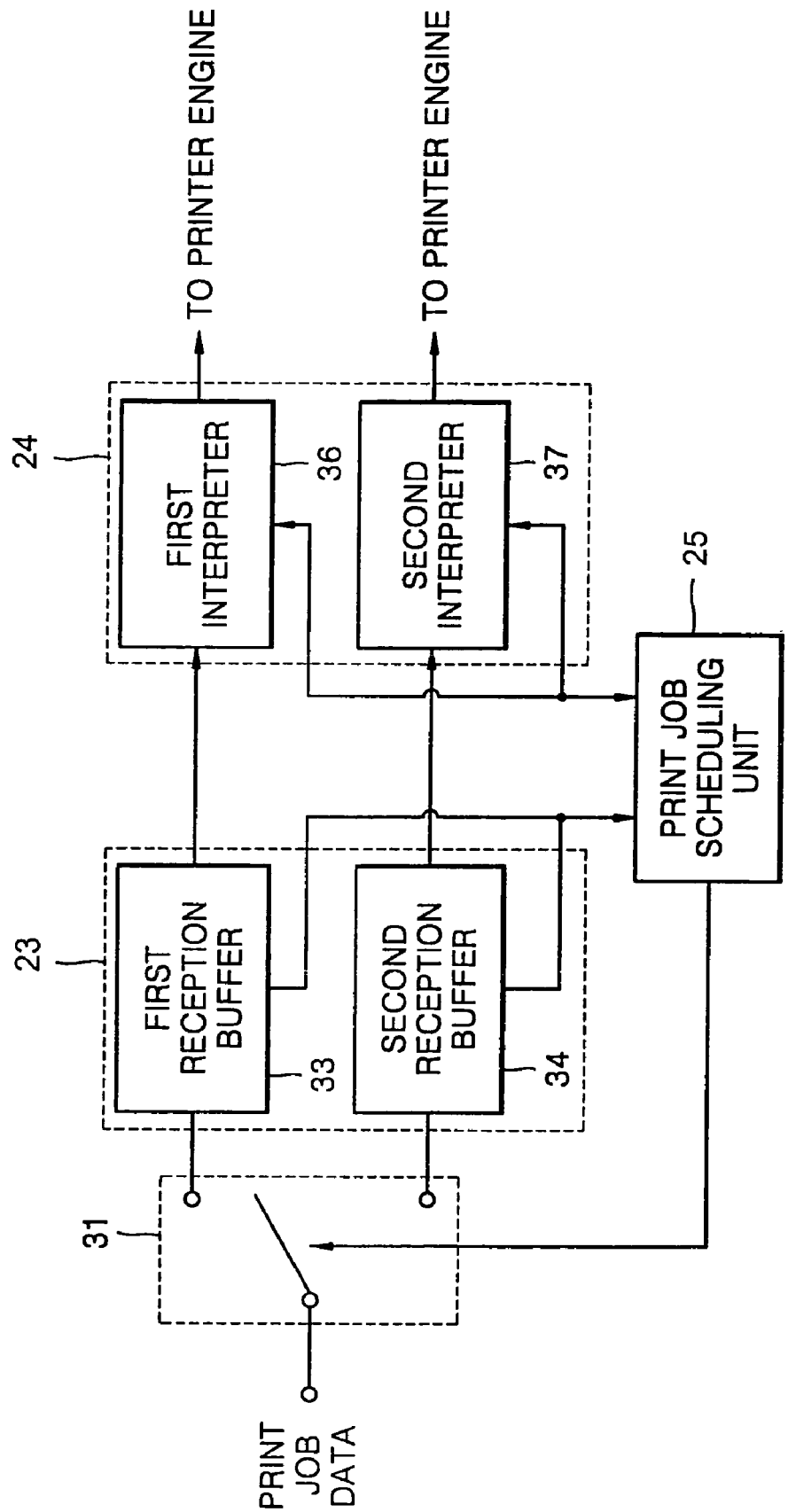
FIG. 3 is a detailed block diagram of a first memory unit and a printing control unit shown in FIG. 2.

FIG. 3 is a detailed block diagram illustrating the operation of the second memory unit 23 and the printing control unit 24 of FIG. 2. The following description focuses on the printing control unit 24, which accesses the interpreters of the first memory unit 22 of FIG. 2 to perform interpretation.

A switching unit 31 passes the print job data transmitted from the client computer 11, 12 to either the first reception buffer 32 or the second reception buffer 34 in response to a control signal output from the print job scheduling unit 25.

The printing control unit 24 employs a first interpreter 36 and a second interpreter 37 stored in the first memory unit 22. In the embodiment of the present invention, the first interpreter 36 and the second interpreter 37 are different types of interpreters, such as a PCL interpreter and a PS interpreter, respectively. The second memory unit 23 includes the first reception buffer 33 and the second reception buffer 34. Although in this embodiment the second memory unit 23 is described as including two reception buffers, for convenience of understanding, the second memory unit 23 may include a plurality of reception buffers depending on the network environment, the network printer capacity, and, particularly, the memory size of the second memory unit 23. Likewise, although the first interpreter 36 and the second interpreter 37 are described as being different types (i.e., PCL and PS interpreters, respectively), the first interpreter 36 and the second interpreter 37 may be the same type (i.e., both can be either PCL interpreters or PS interpreters). In addition, the first memory unit 22 may include a plurality of interpreters depending on the network printer capacity.

The print job scheduling unit 25 provides a control signal, which indicates whether the first reception buffer 33 and the second reception buffer 34 are empty or full, to the switching unit 31 and controls the printing control unit 24 based on the first and second scheduling procedures, to be described later, to enable the printing control unit 24 to interpret the print job data received from the first reception buffer 33 or the second reception buffer 34.

Figure 4:
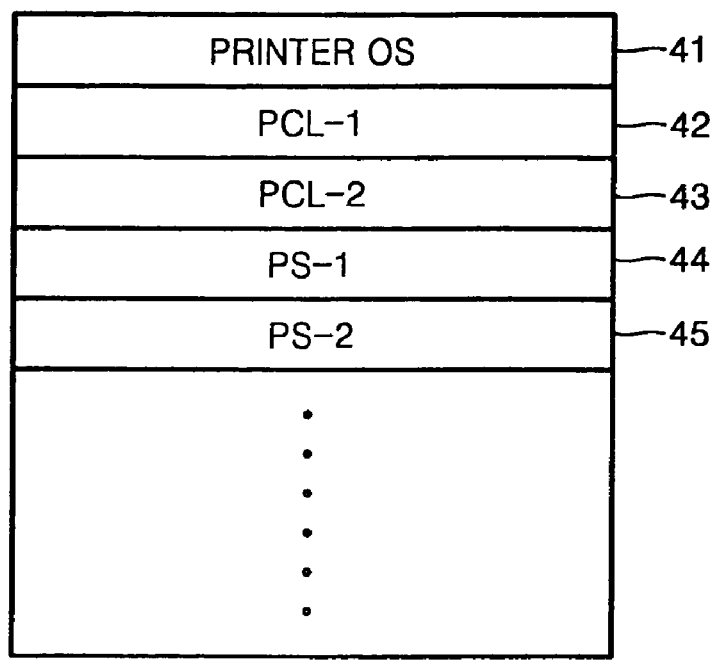
FIG. 4 is a mapping diagram of the first memory unit of FIG. 2.

FIG. 4 is a mapping diagram of the first memory unit 22 of FIG. 2, which includes a first area 41 for storing the printer OS, a second area 42 for storing a first PCL interpreter PCL-1, a third area 43 for storing a second PCL interpreter PCL-2, a fourth area 44 for storing a first PS interpreter PS-1, a fifth area 45 for storing a second PS interpreter PS-2, etc. In the embodiment of the present invention, it is assumed that there are two print jobs to be scheduled. In addition, two interpreter areas are assigned in the first memory unit 22 for the first interpreter 36 and the second interpreter 37 (i.e., for each of the PCL and PS interpreters).

Alternatively, a plurality of interpreters may be stored in the first memory unit 22 as described below, depending on the memory size of the first memory unit 22 and/or the second memory unit 23.

When the first memory unit 22 has sufficient memory capacity, a plurality of interpreters are stored in the first memory unit 22 and are assigned different link addresses.

When the first memory unit 22 has insufficient memory capacity while the second memory unit 23 has sufficient memory capacity, a plurality of compressed interpreters may be stored in the first memory unit 22 to be decompressed and copied later into the second memory unit 23 for print job interpretation. In this case, the plurality of compressed interpreters are encoded as RAM executable codes, linked, and compressed to be executable in other RAM addresses.

Figure 5:
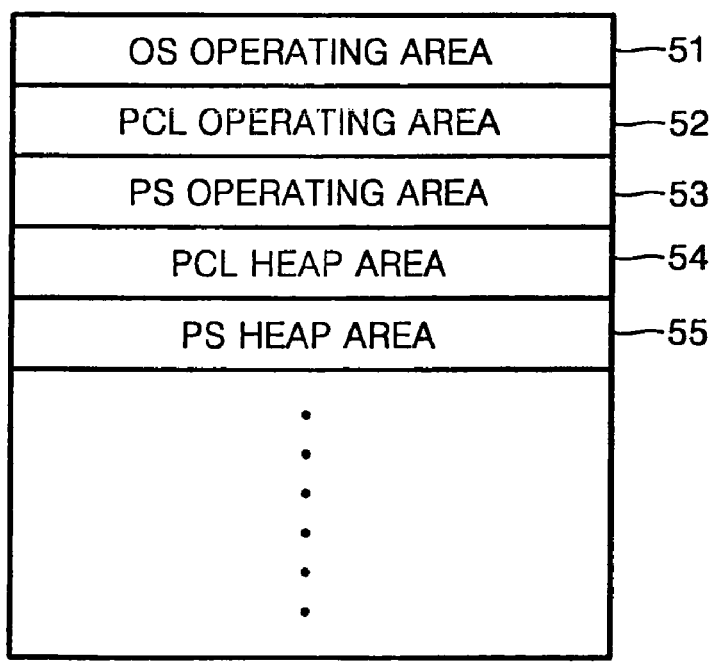
FIG. 5 is a mapping diagram of a second memory unit shown in FIG. 2.

FIG. 5 is a mapping diagram of the second memory unit 23 of FIG. 2, which includes a first area 51 as an operating area of the printer OS, a second area 52 as an operating area of the first and second PCL interpreters PCL-1 and PCL-2, a third area 53 as an operating area of first and second PS interpreters PS-1 and PS-2, a fourth area 54 as a heap area of the first and second PCL interpreters PCL-1 and PCL-2, a fifth area 55 as a heap area of the first and second PS interpreters PS-1 and PS-2, etc. The fourth and fifth areas 54 and 55, described as heap areas, are for dynamic memory allocation required during interpretation and occupy most of the second memory unit 23. In particular, when the first interpreter 36 or the second interpreter 37 receives data to process, the heap areas 54 and 55 are used to temporarily store the received data or to convert the received data into printable data, the conversion requiring large-memory allocation/deallocation.

When the first interpreter 36 or the second interpreter 37 starts to interpret print job A, the fourth or fifth area 54 or 55 is repeatedly allocated as a heap area and freed to process the data of print job A. When most of the fourth or fifth area 54 or 55 is used as the heap area for print job A, no space may remain in the fourth or fifth area 54 or 55 to be allocated as a heap area for print job B, which starts to be interpreted by the first interpreter 36 or the second interpreter 37. To prevent this situation, heap areas are allocated in one of the following three ways, depending on the capacity of the second memory unit 23.

A first allocation method is to share a heap area in the fourth or fifth area 54 or 55 for multiple print jobs. According to this method, when most of the fourth or fifth area 54 or 55 is used as a heap area for print job A, the first interpreter 36 or the second interpreter 37 must wait to interpret print job B until a predetermined heap area is provided for print job B.

A second allocation method is to allocate a predetermined heap area for each print job in the fourth or fifth area 54 or 55. According to this method, a heap area for print job A in the fourth or fifth area 54 or 55 is distinguished from a heap area for print job B. Even if print job A starts to be interpreted earlier than print job B, the heap previously assigned for print job B is reserved for print job B. Heap areas may be allocated uniformly for individual print jobs. For efficiency in use, allocated heap areas include a heap area for print job A, a heap area for print job B, and a common heap area for print jobs A and B.

A third allocation method is to divide the entire heap region of the fourth or fifth area 54 or 55 into segments of a predetermined size for segment-based print job interpretation. In particular, once print job A starts to be interpreted, heap segments are assigned for the interpretation of print job A. Then, as print job B starts to be interpreted, the heap area for print job B is assigned from the segment following the last heap segment for print job A. Heap utilization efficiency is maximized with this method.

Figure 6:
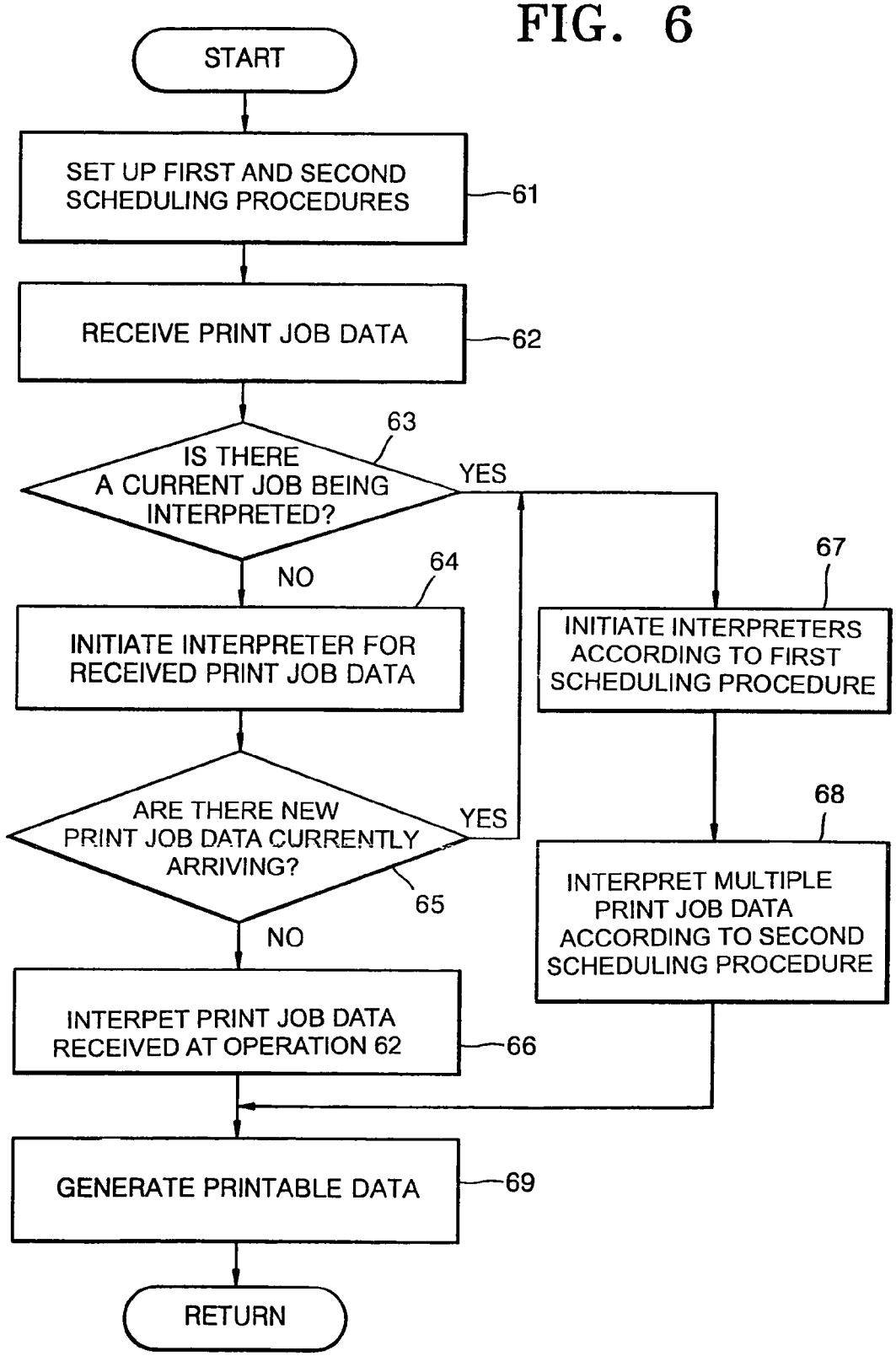
FIG. 6 is a flowchart illustrating a method of controlling a print job schedule according to the embodiment of the present invention.

FIG. 6 is a flowchart illustrating a print job schedule control method according to the embodiment of the present invention, which will be described in connection with FIG. 3.

Referring to FIG. 6, at operation 61, the print job scheduling unit 25 establishes a first scheduling procedure regarding the initiation of the first interpreter 36 and the second interpreter 37 in response to multiple print job requests, and a second scheduling procedure regarding a process of interpreting the multiple print jobs that have been initiated. The first and second scheduling procedures will be described later in detail with reference to FIGS. 7 and 8.

When the network printer 14 receives print job data from the client computers 11 and 12 at operation 62, the print job scheduling unit 25 checks whether the first reception buffer 33 and the second reception buffer 34 are full or empty, and transmits to the switching unit 31 a control signal indicating which reception buffer is empty and available for the received print job data. At this time, if both the first reception buffer 33 and the second reception buffer 34 are full, the print job scheduling unit 25 sends a waiting signal to the client computers 11 and 12 that sent the print job data.

At operation 63, the print job scheduling unit 25 determines whether there is a current job being interpreted, based on the information available from the printer OS of the printing control unit 24. If there is a current job being interpreted, control proceeds to operation 67 (described later).

At operation 64, if it is determined at operation 63 that no current job is being interpreted, the printing control unit 24 calls an available interpreter from the first memory unit 22 to initiate the called interpreter for the received print job. Once the interpreter is initiated, the print job scheduling unit 25 waits a predetermined amount of time after the initiation of the interpretation, based on the printer OS of the printing control unit 24, to determine whether the interpretation of the received job data has been completed within the predetermined amount of time and to use the result of the determination as reference data for the next print job scheduling.

After a predetermined amount of time has passed after operation 64 has completed, it is determined at operation 65 whether new print job data are currently arriving at the first reception buffer 33 or the second reception buffer 34. If there are new print job data currently arriving at the first reception buffer 33 or the second reception buffer 34, control proceeds to operation 67 (described later). If there are no new print job data currently arriving at the first reception buffer 33 or the second reception buffer 34, the print job data received at operation 62 are processed by the called interpreter at operation 66 and converted into printable data at operation 69.

If it is determined at operation 63 that there is a print job being interpreted or if it is determined at operation 65 that there are new print job data arriving at the first reception buffer 33 or the second reception buffer 34, a new schedule for initiating the first interpreter 36 and the second interpreter 37 for the multiple print jobs is established based on the first scheduling procedure determined at operation 61. This new scheduling for the initiation of the first interpreter 36 and the second interpreter 37 is described in detail below.

Figure 7:
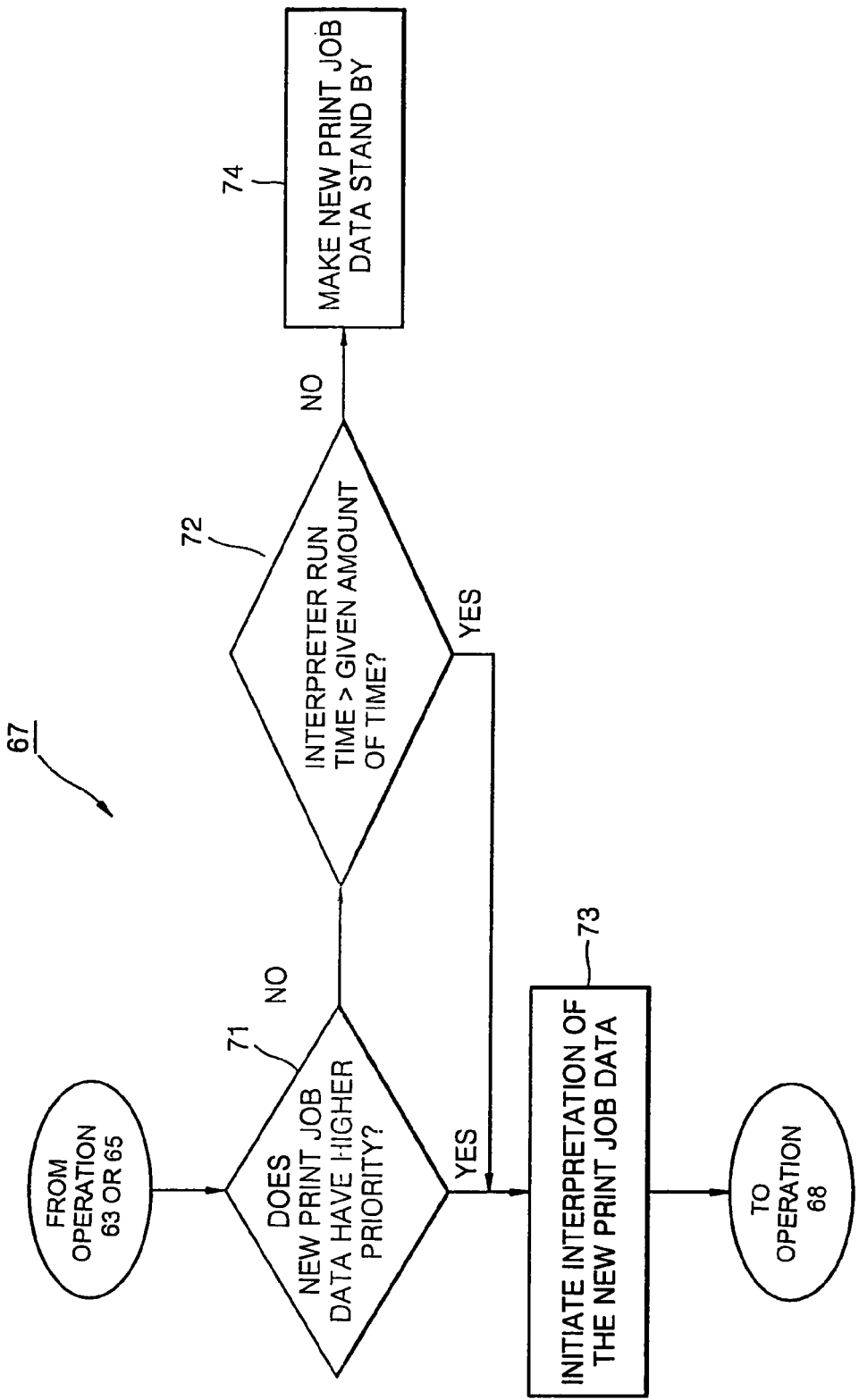
FIG. 7 is a flowchart illustrating an operation shown in FIG. 6 of initiating interpreters for multiple print jobs.

FIG. 7 is a flowchart illustrating operation 67 of FIG. 6, which is scheduling the initiation of the first interpreter 36 and the second interpreter 37 for multiple print jobs. Referring to FIG. 7, it is determined at operation 71 whether the new print job data have higher priority than the previously received print job data by a priority comparison between the previously received print job data being interpreted and the new print job data. The network printing system has a job priority policy, which is established based on printing urgency and/or user priority, etc. The job priority policy enables higher priority print job data to be interpreted earlier than lower priority print job data being interpreted.

If the newly received print job data are determined at operation 71 not to be higher priority data, it is determined at operation 72 whether the interpreter run time for the previous print job data exceeds a predetermined amount of time, which is previously set by the print job scheduling unit 25.

If the newly received print job data are determined at operation 71 to be higher priority data or if it is determined at operation 72 that the interpreter run time for the previous print job data has exceeded the predetermined amount of time, an available interpreter for the newly received print job data is called at operation 73 from the first memory unit 22 to initiate the available interpreter.

If it is determined at operation 72 that the interpreter run time for the previous print job data has not exceeded the predetermined amount of time, the newly received print job data are made stand by data at operation 74.

Referring to FIG. 6, after the initiation of the first interpreter 36 and the second interpreter 37 at operation 67 for multiple print jobs based on the first scheduling procedure, a schedule for interpreting the multiple print job data that have been initiated is established based on the second scheduling procedure at operation 68. Operation 68 is described below in detail with reference to FIG. 8.

Figure 8:
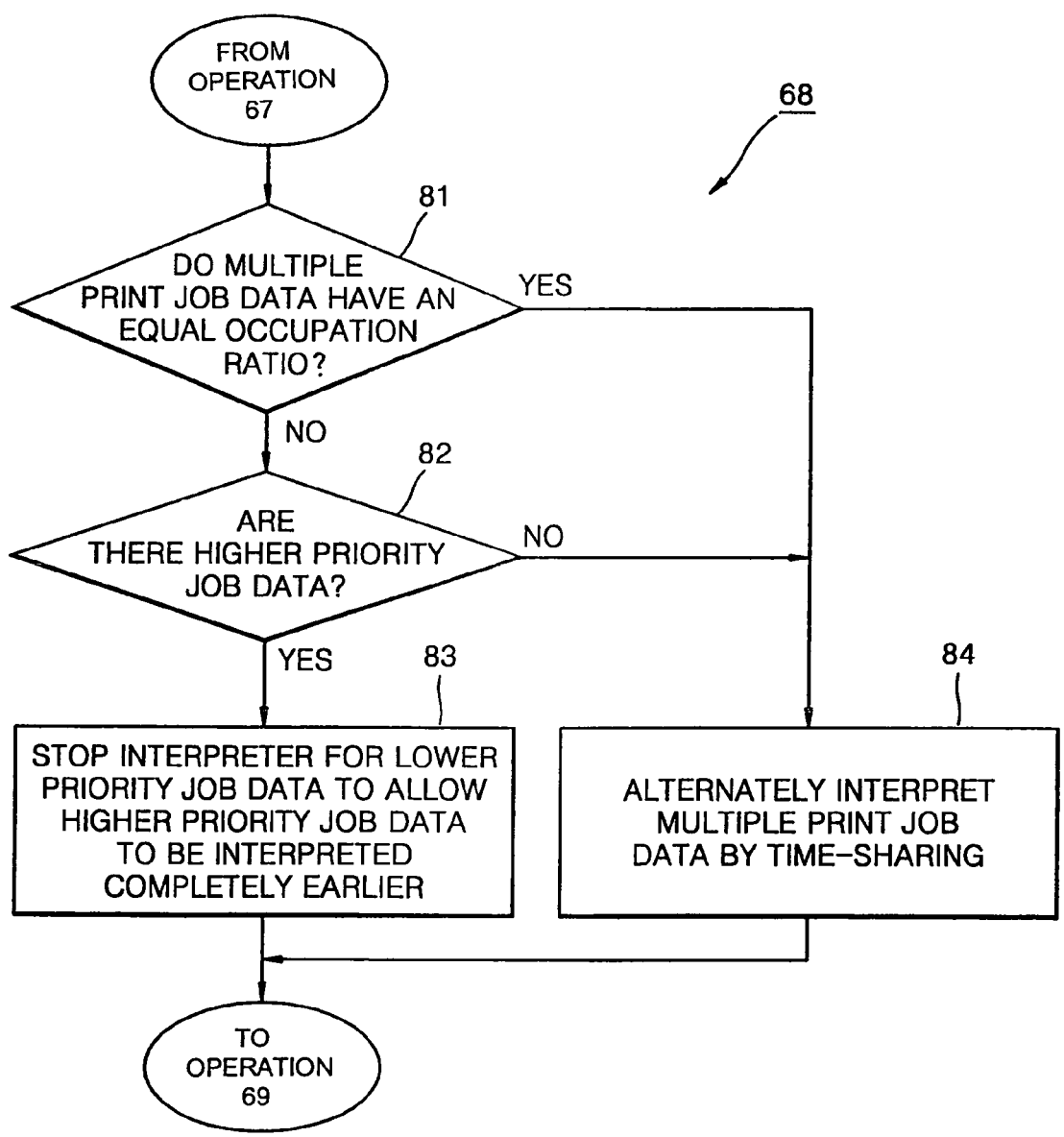
FIG. 8 is a flowchart illustrating an operation shown in FIG. 6 of interpreting the multiple print job data.

FIG. 8 is a flowchart illustrating operation 68 of FIG. 6, which involves scheduling a process of the multiple print job data being interpreted.

Referring to FIG. 8, it is determined at operation 81 whether the multiple print job data being interpreted have equal occupation ratios.

If it is determined at operation 81 that the multiple print job data being interpreted not have equal occupation ratios, it is determined at operation 82 whether there are higher priority job data.

If it is determined at operation 82 that there are higher priority job data being interpreted, the interpreter for the lower priority job data is interrupted at operation 83 to allow the higher priority job data to be completely interpreted earlier.

If the multiple print job data being interpreted are determined at operation 81 to have equal occupation ratios or if it is determined at operation 82 that no higher priority job data exist, the multiple print job data are interpreted alternately for a predetermined amount of time at operation 84 by time-sharing. Alternatively, the multiple print job data may be interpreted in the order of occupation ratios if the multiple print job data being interpreted have different occupation ratios. Time-sharing interpretation is achieved by storing a plurality of interpreters into the first memory unit 22 and by allocating a plurality of reception buffer areas and operating and heap areas for each of the plurality of interpreters in the second memory unit 23. In the embodiment of the present invention, the second or the third heap allocation method described above is used.

Although the above embodiment of the present invention is described with reference to a network printing system, the print job schedule control method according to the embodiment of the present invention may be applied to a non-network printing system that is not shared by multiple users, and, particularly, to a high-speed printing system, without significant modifications. In this case, a job priority policy for the non-network printing system is determined by print job priority, rather than by user priority. In particular, when a user sequentially requests the printing system to perform multiple print jobs, the user is allowed to transmit a data packet including job priority data to the printing system. The printing system checks the data packet including the job priority data and performs printing according to the job priority from the data packet.

The above-described invention may be embodied as computer-readable program code or may be embodied in a general purpose digital computer by running such a program from a computer-readable medium, including, but not limited to, storage media such as magnetic storage media (e.g., ROMs, floppy disks, hard disks, etc.), optically readable media (e.g., CD-ROMs, DVDs, etc.) and carrier waves (e.g., transmissions over the Internet).

According to the present invention described above, a schedule for multiple print jobs, which are requested in sequential order, can be flexibly changed based on the first and second scheduling procedures established according to printing urgency and/or user priority and interpreter run time. As a result, a smaller document can be printed sooner than a larger document without waiting for the larger document to finish printing.

Although an embodiment of the present invention has been shown and described, it will be appreciated by those skilled in the art that changes may be made in this embodiment without departing from the principles and spirit of the invention, the scope of which is defined in the appended claims and their equivalents. For example, the type and the number of interpreters stored in the first memory unit 22 and the number of reception buffers for the second memory unit 23 may be varied.

What is claimed is:

1. A method of controlling a print job schedule, the method comprising:

scheduling initiation of interpreters according to a first scheduling procedure depending on print job priority between preceding print job data having interpretation initiated and succeeding print job data; and scheduling a process of interpretation of multiple print job data having interpretation initiated according to a second scheduling procedure depending on occupation ratios and print job priority, wherein the second scheduling procedure involves alternately interpreting the multiple print job data, which have started to be interpreted, by time-sharing, when the multiple print job data have equal occupation ratios without priorities.

2. The method of claim 1, wherein the first scheduling procedure involves initiating interpretation of higher priority job data earlier than preceding print job data having interpretation already initiated.

3. The method of claim 2, wherein the first scheduling procedure involves allowing interpretation of new print job data to be initiated earlier than the preceding print job data, even when the new print job data do not have higher priority, when an interpreter run time of the preceding initiated print job data has exceeded a predetermined amount of time.

4. The method of claim 2, wherein the second scheduling procedure comprises scheduling interpretation of the multiple print job data, which have started to be interpreted, according to the occupation ratios when the multiple print job data have different occupation ratios without priorities.

5. The method of claim 1, wherein, when interpretation of higher priority print job data has been initiated, the second scheduling procedure schedules termination of interpretation of lower priority print job data to enable the higher priority print job data to be completely interpreted sooner than the lower priority print job data, regardless of the occupation ratios of the multiple print job data having interpretation already initiated.

6. A method of controlling a print job schedule, the method comprising:

scheduling initiation of interpreters to initiate interpretation of succeeding print job data earlier, even when preceding print job data are being interpreted, when an interpreter run time for the preceding print job data exceeds a predetermined amount of time; and scheduling interpretation of multiple print job data by time-sharing to alternate between the multiple print job data when the multiple print job data have equal occupation ratios without priorities, or scheduling interpretation of multiple print job data by time-sharing according to occupation ratios when the multiple print job data have different occupation ratios without priorities.

7. The method of claim 6, further comprising scheduling initiation of the interpreters to initiate interpretation of the succeeding print job data earlier, even when the preceding print job data are already being interpreted, when the succeeding print job data have priority.

8. The method of claim 6, further comprising scheduling interpretation of multiple print job data to terminate interpretation of lower priority print job data to enable higher priority print job data to be completely interpreted earlier when the multiple print job data being interpreted have higher priority, regardless of the occupation ratios of the multiple print job data being interpreted.

9. A method of controlling a print job schedule for multiple print jobs that are requested in sequential order, the method comprising:

scheduling initiation of interpreters according to a first scheduling procedure depending on print job priority between preceding print job data having interpretation initiated and succeeding print job data;

scheduling a process of interpretation of multiple print job data having interpretation initiated according to a second scheduling procedure depending on interpreter run time and print job priority; and changing the print job schedule according to the first scheduling procedure and the second scheduling procedure.

* * * * *